UNITED STATES PATENT OFFICE.

ALVIN A. SCHMIDT, OF CHICAGO, ILLINOIS.

METHOD FOR TREATING THE INTERIOR SURFACES OF MOLDS.

967,982.  Specification of Letters Patent.  Patented Aug. 23, 1910.

No Drawing.  Application filed September 2, 1909.  Serial No. 515,898.

*To all whom it may concern:*

Be it known that I, ALVIN A. SCHMIDT, a citizen of the United States, residing at Chicago, county of Cook, and State of Illinois, have invented a certain new and Improved Method for Treating the Interior Surface of Molds, of which the following is a specification.

My invention relates to an improved method for treating the interior surfaces of molds especially adapted for use in molds for making concrete or Portland cement castings, and has for its object the production of a method for treating the interior surfaces of molds, whereby clear and sharp castings will be produced.

My invention consists in the method hereinafter described and claimed.

The composition consists of 50 pounds of carbon tetra chlorid, 1 pound of para rubber, and 5 pounds of French chalk dissolved cold for at least three weeks. Two or three coats of this composition should be applied to the interior surfaces of the mold. The composition deposits a rubber surface on the interior of the mold, the tetra chlorid partially evaporating. If desired, this coating may be further treated with pure lard oil and allowed to stand for about an hour. Then the mold may be dusted out with French chalk or other dust and is ready for use.

This method may be used on any desired form of mold or a mold made of any desired material with good success. It will be found, if the mold is otherwise properly made, to greatly facilitate the production of clear and sharp castings and the separation of the casting from the mold.

While I have described the preferred method of procedure and proportions of ingredients, these may be varied somewhat while still coming within the scope of the appended claims.

Having described my invention what I claim as new and desire to secure by Letters Patent is:

1. The method of preparing molds which consists in first forming the mold of suitable material and then treating its interior surface with rubber and chalk in carbon tetra chlorid, substantially as described.

2. The method of preparing molds which consists in first treating the interior surface of the mold with rubber and chalk dissolved cold in carbon tetra chlorid and then treating said interior surface with lard oil and chalk dust, substantially as described.

3. The method of preparing molds which consists in first treating the interior surface of the mold with one pound of para rubber and five pounds of French chalk dissolved cold in fifty pounds of carbon tetra chlorid and then treating said interior surface with lard oil and chalk dust, substantially as described.

In testimony whereof I have signed my name to this specification in the presence of two subscribing witnesses.

ALVIN A. SCHMIDT.

Witnesses:
  HELEN F. LILLIS,
  JOSHUA R. H. POTTS.